US012030068B2

(12) United States Patent
Baldessari et al.

(10) Patent No.: US 12,030,068 B2
(45) Date of Patent: Jul. 9, 2024

(54) HAND DISPENSER FOR LIQUID PRODUCTS

(71) Applicant: ZOBELE HOLDING S.p.A., Trento (IT)

(72) Inventors: Stefano Baldessari, Trento (IT); Stefano Deflorian, Trento (IT)

(73) Assignee: ZOBELE HOLDING S.P.A., Trento (IT)

( * ) Notice: Subject to any disclaimer, the term of this patent is extended or adjusted under 35 U.S.C. 154(b) by 0 days.

(21) Appl. No.: 18/256,557

(22) PCT Filed: Oct. 20, 2021

(86) PCT No.: PCT/IB2021/059669
§ 371 (c)(1),
(2) Date: Jun. 8, 2023

(87) PCT Pub. No.: WO2022/130047
PCT Pub. Date: Jun. 23, 2022

(65) Prior Publication Data

US 2024/0033761 A1 Feb. 1, 2024

(30) Foreign Application Priority Data

Dec. 18, 2020 (IT) ........................ 102020000031517

(51) Int. Cl.
*B05B 11/00* (2023.01)
*B05B 11/10* (2023.01)
*B05B 15/70* (2018.01)

(52) U.S. Cl.
CPC ...... *B05B 11/1052* (2023.01); *B05B 11/0038* (2018.08); *B05B 11/0054* (2013.01); *B05B 15/70* (2018.02)

(58) Field of Classification Search
CPC ............. B05B 11/1052; B05B 11/1056; B05B 11/109; B05B 11/0038; B05B 11/0054; B05B 11/00; B05B 11/70
See application file for complete search history.

(56) References Cited

U.S. PATENT DOCUMENTS 4,678,105 A * 7/1987 Heck ..................... B05B 11/026 222/325
5,016,781 A * 5/1991 Ten Wolde ......... B05B 11/1052 222/162

(Continued)

FOREIGN PATENT DOCUMENTS

GB 2542397 A 3/2017

OTHER PUBLICATIONS

International Search Report and Written Opinion of the ISA for PCT/IB2021/059669 mailed Mar. 14, 2022, 10 pages.

(Continued)

*Primary Examiner* — Frederick C Nicolas
(74) *Attorney, Agent, or Firm* — NIXON & VANDERHYE

(57) ABSTRACT

Hand dispenser for cleaning, disinfectant and/or perfuming liquid products, of the type including a container having a dispensing button which operates a piston of a piston pump for dispensing liquid product from a nozzle, and a seat for a refill including a bottle containing a sprayable liquid formulation, the piston pump being indifferently housed in the container or in the refill. The container includes a cover hinged on the container, for closing the seat of the refill, and a mechanical coupling between the cover and the dispensing button, which causes the dispensing button to raise beyond its ordinary rest position, when the cover is opened, and to lower to its ordinary rest position, when the cover is closed.

20 Claims, 4 Drawing Sheets

(56) References Cited

U.S. PATENT DOCUMENTS

| | | | | |
|---|---|---|---|---|
| 5,082,149 | A | 1/1992 | Cross | |
| 5,377,869 | A * | 1/1995 | Weiss | B05B 11/0038 222/162 |
| 6,302,101 | B1 * | 10/2001 | Py | B05B 11/1066 128/200.22 |
| 6,305,580 | B1 * | 10/2001 | Chen | B05B 11/1056 222/321.9 |
| 6,454,135 | B1 * | 9/2002 | Brozell | B05B 11/1011 222/162 |
| 8,336,740 | B1 * | 12/2012 | Daansen | A47K 5/1207 222/325 |
| 2010/0155399 | A1 * | 6/2010 | Wilson | A61L 2/22 220/87.2 |
| 2012/0248148 | A1 * | 10/2012 | Bunoz | B05B 11/007 222/190 |
| 2015/0034677 | A1 * | 2/2015 | Duncan | A47K 5/12 222/181.3 |
| 2017/0105585 | A1 * | 4/2017 | Wertheim | A47K 5/1202 |

OTHER PUBLICATIONS

International Preliminary Report on Patentability for PCT/IB2021/059669 completed Feb. 24, 2023, 5 pages.

* cited by examiner

HAND DISPENSER FOR LIQUID PRODUCTS

CROSS-REFERENCE TO RELATED APPLICATIONS

This application is the U.S. national phase of International Application No. PCT/IB2021/059669 filed Oct. 20, 2021, which designated the U.S. and claims priority to IT 102020000031517 filed Dec. 18, 2020, the entire contents of each of which are hereby incorporated by reference.

FIELD OF THE INVENTION

The present invention refers to a hand dispenser for liquid products such as, e.g., cleaning, disinfectant, and perfuming products, and thus any sprayable liquid formulation that can be used for washing, disinfection, or perfuming. In particular, the invention refers to a portable dispenser with piston pump for liquid products, which is placed on a shelf near the sanitary washing appliance when in use, and from which the liquid product is dispensed by simply pressing a dispensing button of the piston pump with the fingers of one hand, while the other hand collects the dispensed product. Going into even greater detail, the hand dispenser for liquid products of the present invention is of the type which comprises a container, wherein the dispensing button of the piston pump is housed, and a refill consisting of a bottle containing the cleaning, disinfectant and/or perfuming sprayable liquid formulation, said refill being stably housed in said container.

STATE OF THE PRIOR ART

In the hand dispensers for liquid products of the known type described above, the piston pump which allows the dispensing of liquid product is more frequently included in the refill and, particularly, in the upper end of the dip tube taking up the liquid product, while the dispensing button with relative distribution nozzle is embedded in the container. In this known arrangement, the movable piston of said pump projects from the upper part of the refill and, when replacing the refill, it must be inserted into said dispensing button. This causes a certain difficulty in the replacement of the refill inside its housing seat formed in the container, due to the interference occurring between said movable piston and the pump dispensing button in a normal front insertion, where the term “front insertion” here and hereinafter means an insertion of the refill in a direction perpendicular to the widest surface of its housing seat in the container.

Insertion of the bottle in a slant direction with respect to the container is therefore requested, otherwise the dispensing button of the pump must be maintained raised with one hand while inserting the bottle, both these operations being difficult for a user. This drawback has therefore led to a limited diffusion of this type of hand dispenser for liquid products, despite the durability and aesthetics advantages that a multipurpose container can offer and, at the same time, the inherent economic advantages of producing refills which do not remain at sight of the users and can therefore be made of inferior quality materials.

The problem addressed by the present invention is therefore that of providing a hand dispenser for liquid products of the type described above, wherein the operations of insertion and extraction of the refill can be carried out in an easy and intuitive way.

In the context of this problem, a first object of the invention is to allow an easy and convenient front insertion of the refill bottle into its housing seat formed in the container.

Moreover, a second object of the invention is that the user can insert the refill bottle without looking for the orientation thereof and/or for the mutual engagement of the movable piston protruding from the refill with the dispensing button provided on the container.

SUMMARY OF THE INVENTION

This problem is solved, and these objects achieved, by means of a dispenser for liquid products having the features disclosed in claim 1. Other preferred features of the dispenser for liquid products according to the present invention are disclosed in the secondary claims.

BRIEF DESCRIPTION OF THE DRAWINGS

Further features and advantages of the dispenser for liquid products according to the present invention will anyhow become more evident from the following detailed description of a preferred embodiment of the same, given by mere way of non-limiting example and illustrated in the accompanying drawings, wherein.

DETAILED DESCRIPTION OF THE PREFERRED EMBODIMENT

Figure 3:
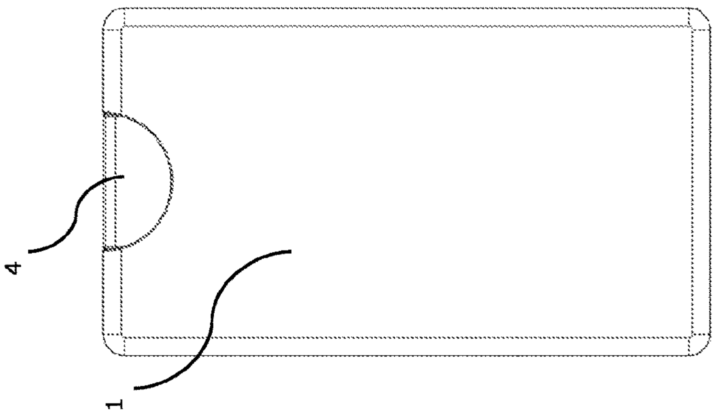
FIG. 3 is a rear view of the dispenser for liquid products of FIG. 1.

According to the present invention, in order to solve the problem indicated above by means of a structurally simple and highly effective solution, a cover hinged on the container has been provided, which cover closes the refill seat and exhibit, on one hand, an aesthetic function, i.e., hiding the refill from sight and imparting a uniform aesthetic style to the dispenser, regardless of the type of refill in use. On the other hand, this hinged cover has been also used to solve the problem underlying the invention, by providing a special mechanical coupling, between said cover and the dispensing button of the piston pump, which automatically causes said dispensing button to raise to a position projecting from the container when said cover is opened, thus clearing the access for an easy and intuitive front insertion/extraction of the refill into/from its seat within the container.

This solution will be described in detail below with reference to an embodiment wherein the piston pump is embedded in the dip tube of the refill, but it is equally applicable in an alternative embodiment too, wherein the piston pump is on the contrary associated to the container.

As clearly shown in the drawings, the hand dispenser for liquid products of the present invention comprises a container 1 and a refill R housed in a respective fitted seat formed in the container 1. In the embodiment here illustrated, the general shape of the container 1 is a straight parallelepiped with rounded edges, while the refill R is similarly shaped but with squared upper edges. It must be clear, however, that the shape of the container 1 and respective refill R are not particularly limited, the only requirement being that the refill R can be stably inserted in its seat within the container 1 with a minimum clearance, to avoid any mutual movement between the container 1 and the refill R when dispensing the liquid product.

The dispensing of liquid product is obtained in a per se known way, by coupling a piston pump, housed within a dip tube of the refill R, and provided of a piston 3 projecting from a cap 2 of said dip tube, with a dispensing button 4 housed in the upper portion of the container 1 and equipped with a nozzle 5. The dispensing button 4 is movable along the axis of the piston 3 to dispense the liquid product by moving the piston 3 against spring contrast means (not shown) biasing the dispensing button 4 away from the piston 3.

Figure 2:
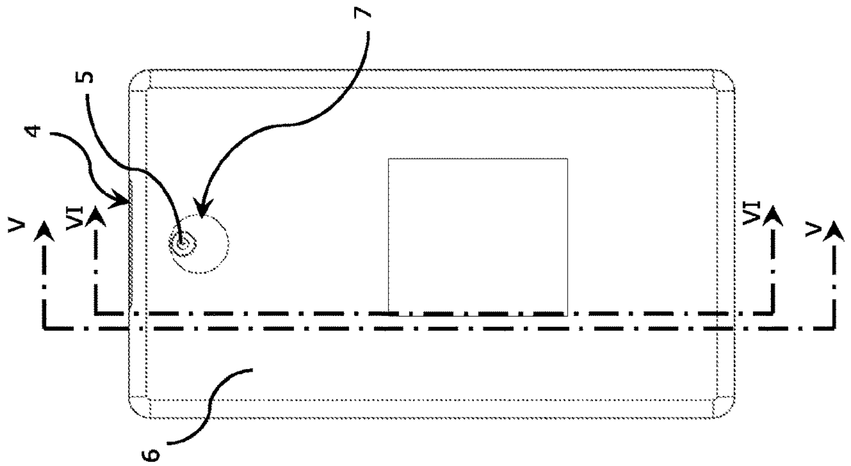
FIG. 2 is a front view of the dispenser for liquid products of FIG. 1, where the cover of the refill seat is in its closed position.
Figure 1:
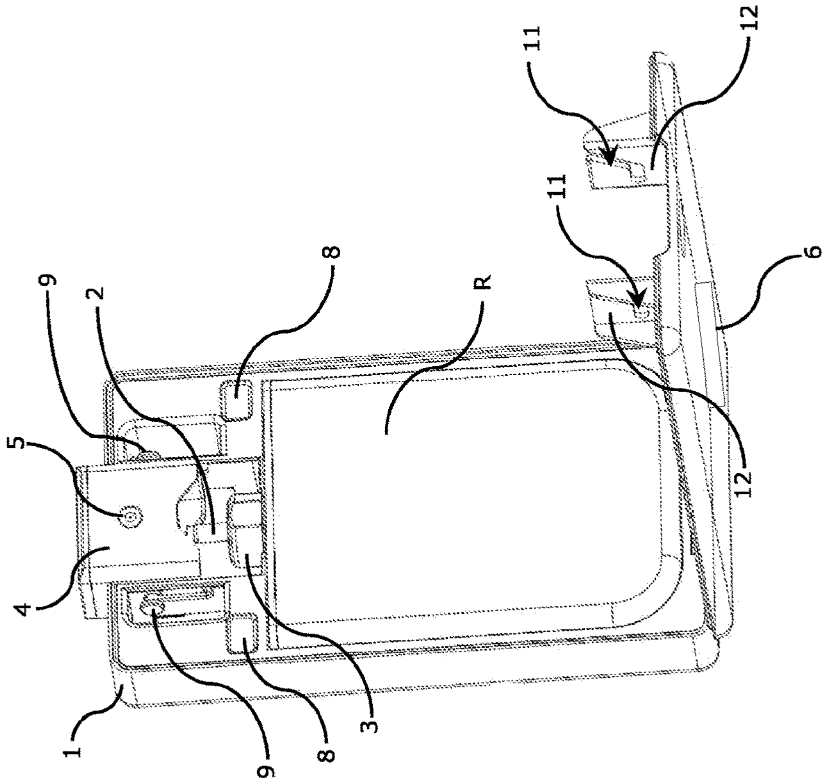
FIG. 1 is a perspective front view of the dispenser for liquid products of the present invention, where the cover of the refill seat is in its fully open position.

According to a first feature of the invention, the container 1 is closed by a cover 6 hinged at its lower side; the cover 6 extends over an entire side surface of the container 1, so as to hide from sight the entire refill R and the dispensing mechanism comprising the piston 3 and the dispensing button 4, and it is further provided of a hole 7 in correspondence of the nozzle 5 (FIG. 2) to allow discharge of the liquid product. The hole 7 is large enough to leave the nozzle 5 free both in its rest position, illustrated in FIG. 2, and in its work position, i.e., when the dispensing button 4 is in its lowered position to dispense the liquid product. The cover 6 is steadily kept in its closed position by two pairs of permanent magnets 8 positioned on the container 1 and on the inside of the cover 6.

As mentioned above, the dispensing button 4 moves in a direction parallel to the axis of the piston 3 by sliding with its side walls and its rear wall on two corresponding internal walls and on a bottom wall of the container 1. As clearly shown in FIGS. 4 and 6, the dispensing button 4 is also equipped with pairs of opposing pins 9 and 10, projecting from its side walls, which slide inside respective slots formed in said internal walls of the container 1, thus providing a safe and firm guide of the dispensing button 4 during its alternated longitudinal movement for dispensing the liquid product. In the illustrated embodiment, the pins 9 have a circular cross-section, extend beyond the internal walls of the container 1 and end with a mushroom head, while the pins 10 have a rectangular cross-section and end flush with said internal walls of the container 1.

According to another feature of the invention, the cover 6 is provided with a pair of brackets 12 projecting perpendicularly from inside the cover 6 and flanking the internal walls of the container 1 when the cover 6 is in its closed position. Guide grooves 11, which are open at one of their ends, are formed in the brackets 12; the above-described pins 9 are engaged inside said grooves 11 when the cover 6 is brought into its closed position, and the mushroom head of said pins 9 acts as a guide for the correct coupling of the guide grooves 11 on the pins 9.

Starting from their open end, the guide grooves 11 include a first inclined length 11*a* followed by a second vertical length 11*b*. The guide grooves 11 are designed such that when the cover 6 is in its closed position the pins 9 are located right at the intersection point between the inclined length 11*a* and the vertical length 11*b* (FIG. 5A). In such a closed position of the cover 6, when the dispensing button 4 is pressed, the pins 9, which are integral therewith, slide inside the vertical length 11*b* of the guide grooves 11, thus allowing a regular operation of the dispenser for liquid products (FIG. 5B).

Figure 5D:
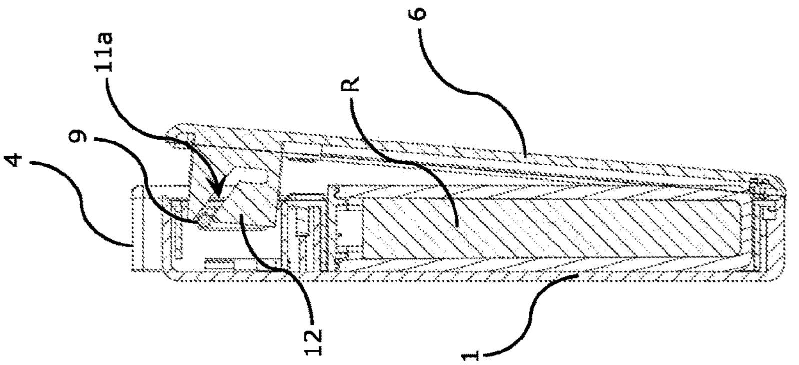
FIGS. 5A to 5D are four cross-sectional views taken along line V-V of FIG. 2, which illustrate different positions of the dispensing button of the piston pump in use (FIGS. 5A and 5B) and in two different steps of initial opening of the cover (FIGS. 5C and 5D)
Figure 5C:
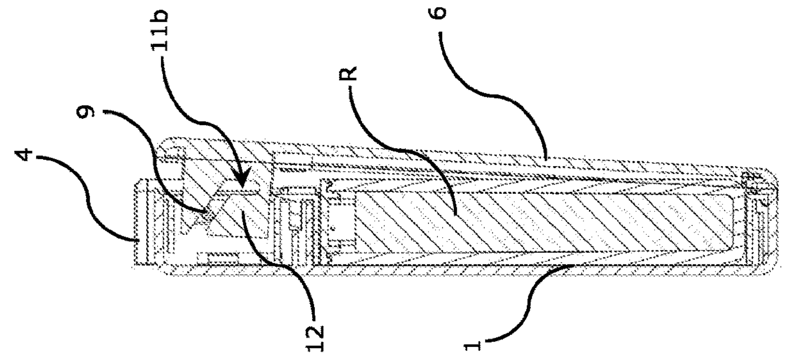
Figure 5B:
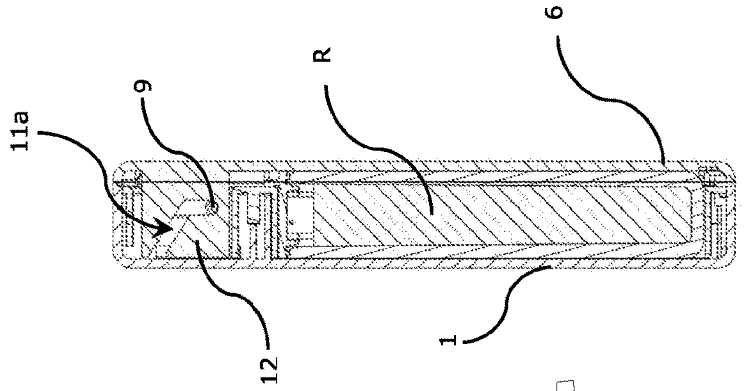
Figure 5A:
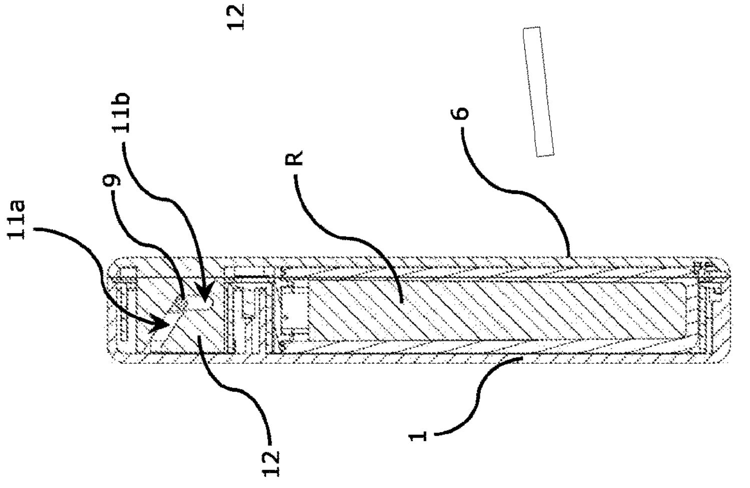
Figure 6A:
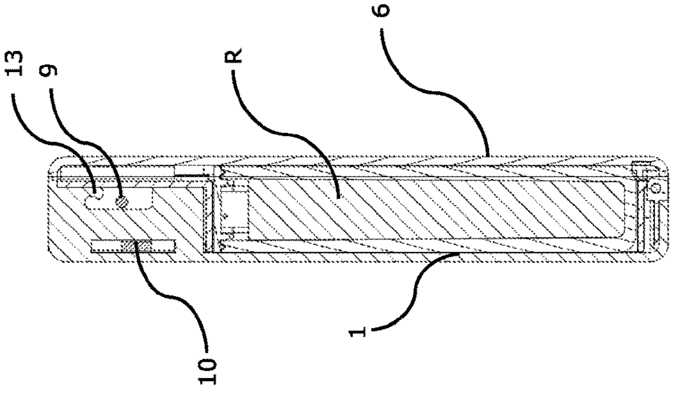
FIGS. 6A to 6D are cross-sectional views taken along line VI-VI of FIG. 2, illustrating different positions of the dispensing button of the piston pump in use (FIGS. 6A and 6B) and in two different steps of initial opening of the cover (FIGS. 6C and 6D)
Figure 6B:
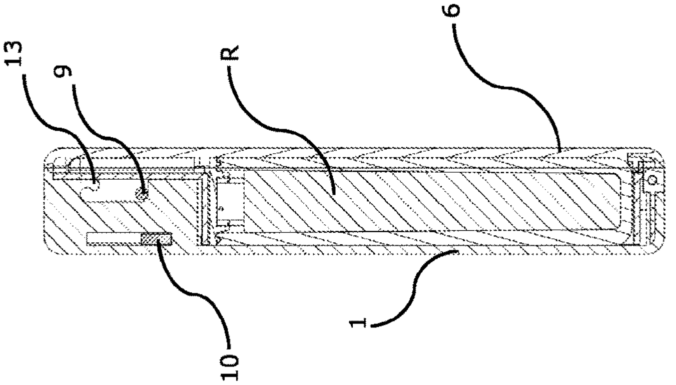
Figure 6C:
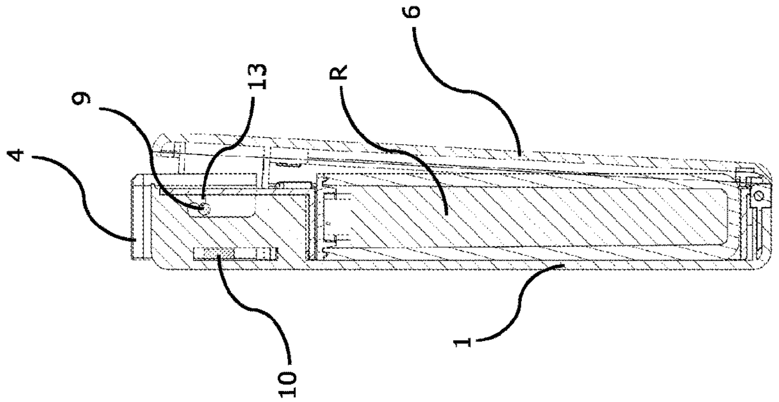
Figure 6D:
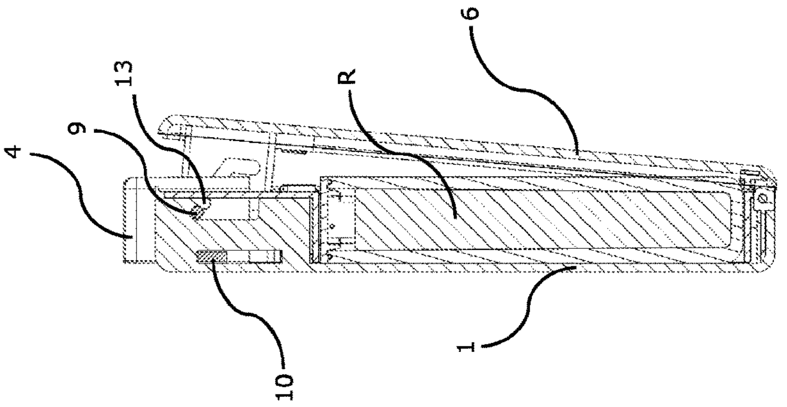

When the refill R is exhausted and needs to be replaced, the user opens the cover 6 and such movement automatically causes the dispensing button 4 to raise, thanks to the engagement between the pins 9, which are integral with said dispensing button 4, and the inclined length 11*a* of the guide grooves 11; two successive steps of this movement are clearly shown in FIGS. 5C and 5D. The guide grooves 11 are finally released from the pins 9, so leaving the dispensing button 4 in a raised position with respect to its normal rest position illustrated in FIG. 5A. In such a position, the pins 9 and 10 have reached the top of their respective slots formed in the internal walls of the container 1, where the pins 9 are held in a steady position by an elastic rib 13. As a matter of fact, such elastic rib 13 is going to be deformed, upon passage of the pins 9 (FIG. 6C), and then elastically returns to its normal position (FIG. 6D) right after this passage, so as to steadily hold in the raised position the pins 9—and therefore the dispensing button 4—whilst the cover 6 is completely opened.

Figure 7:
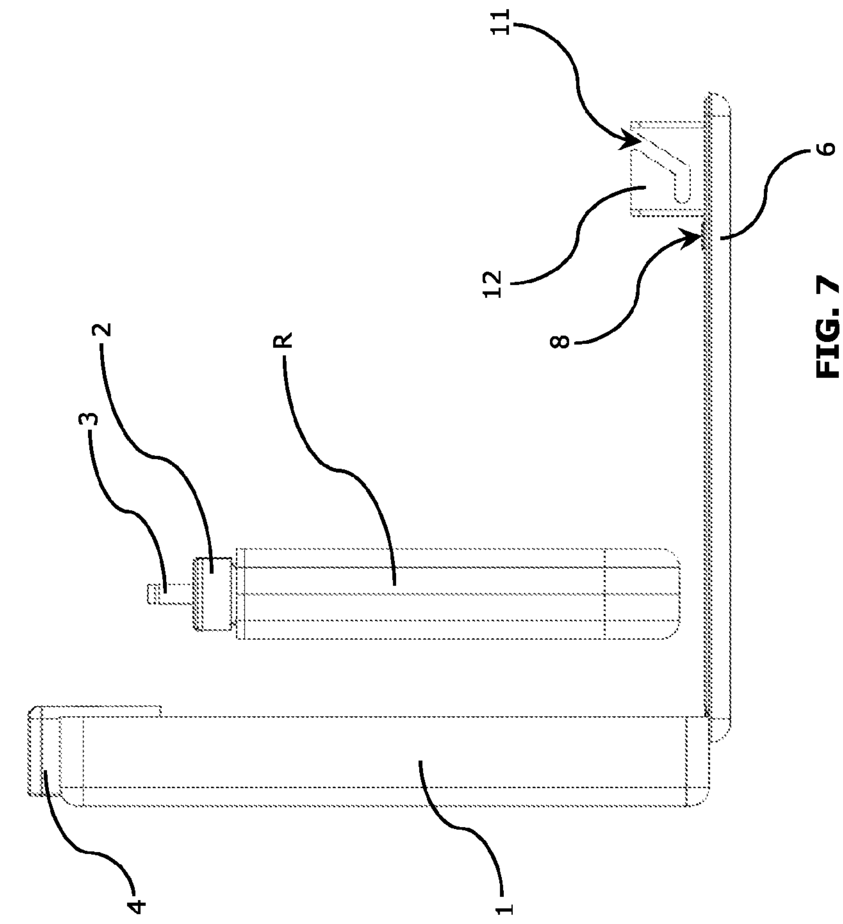
FIG. 7 is a side view of the dispenser for liquid products of FIG. 1, where the cover is in the same fully open position, and the refill is removed from its seat, and placed in front thereof.
Figure 4:
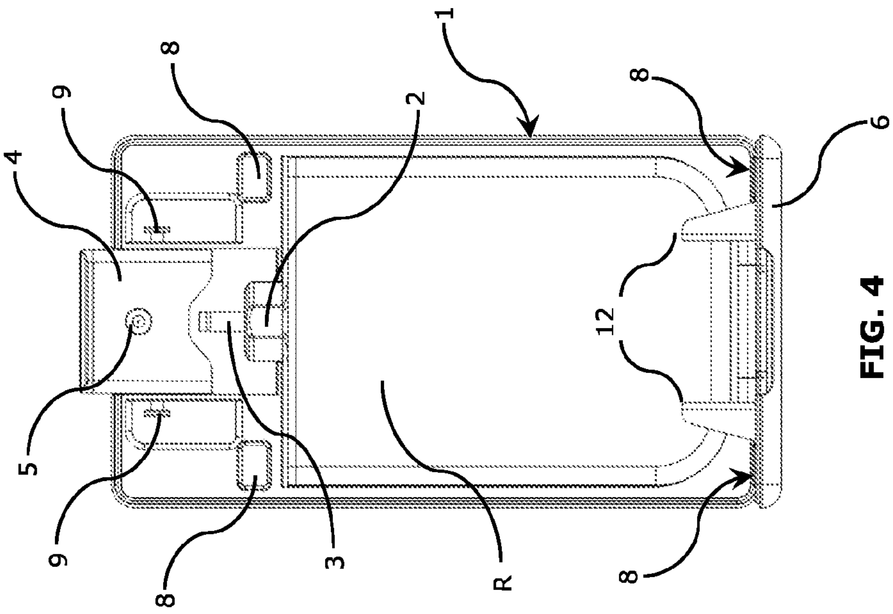
FIG. 4 is a front view of the dispenser for liquid products of FIG. 1, where the cover is in the same fully open position.

As clearly shown in FIGS. 4 and 7, in this raised position of the dispensing button 4 the piston 3 of the refill R is released from the interference with the dispensing button 4 and the refill R can thus be quickly and easily frontally extracted from the container 1, without the user being requested to perform any additional manoeuvre other than simply opening the cover 6.

Once the refill R replacement is completed, it is just sufficient to close the cover 6 to return the dispensing button 4 to its normal rest position, flush with the upper wall of the container 1. This is obtained thanks to the fact that the open ends of the two guide grooves 11 engage on the corresponding pins 9, as illustrated in FIG. 5D, so that an additional closing pressure on the cover 6 causes said pins 9 to slide within the inclined length 11*a* of the guide grooves 11 (FIG. 5C) up to bring back again the dispensing button 4 to its normal rest position (FIG. 5A), when the cover, in its closed position, is steadily blocked through the mutual contact between the pairs of magnets 8. In this position, without performing any further action, the user directly presses the dispensing button 4 to bring it into its work position (FIG. 5B) so dispensing the liquid products from the nozzle 5 while the pins 9 slide inside the vertical length 11*b* of the guide grooves 11.

From the above description it can be noted how the dispenser for liquid products of the present invention has fully achieved the intended objects. As a matter of fact, thanks to the mechanical coupling between the cover 6 and the dispensing button 4, the refill R can be frontally extracted/inserted when the cover 6 is in its open position, without any interference with the dispensing button 4. Said dispensing button 4 is then brought back again to its normal position of mechanical coupling with the refill R without any specific intervention by the user, who in fact simply needs to close the cover 6 of the container 1 to automatically achieve said coupling.

It is anyhow meant that the invention is not to be considered as limited to the arrangements illustrated above, which are only exemplary embodiments thereof, but that different variants are possible, all within the reach of a person skilled in the art, without thereby departing from the scope of protection of the invention itself, which is solely defined by the following claims.

The invention claimed is:

1. A hand dispenser for liquid products comprising a container having a dispensing button which operates a piston of a piston pump for dispensing liquid product from a nozzle, and a seat for a refill comprising a bottle containing a sprayable liquid formulation, said piston pump being housed in said container or in said refill, wherein said container comprises a cover hinged on said container, for closing the seat of the refill, and a mechanical coupling between said cover and said dispensing button which causes the dispensing button to raise beyond an ordinary rest position of the dispensing button, when the cover is opened, and to lower to said ordinary rest position, when the cover is closed.

2. The hand dispenser for liquid products as in claim 1, wherein said mechanical coupling comprises a pair of pins projecting from side walls of the dispensing button and respective guide grooves formed on brackets projecting perpendicularly from inside the cover.

3. The hand dispenser for liquid products as in claim 2, wherein said guide grooves are open at one end thereof, to disengage/engage said pins when the cover is opened/closed.

4. The hand dispenser for liquid products as in claim 3, wherein said dispensing button moves in a direction parallel to the axis of the piston of said piston pump, by sliding with said side walls and a rear wall of said dispensing button on two corresponding internal walls and on a bottom wall of the container, while said pins slide inside respective guide slots formed in said internal walls of the container.

5. The hand dispenser for liquid products as in claim 4, wherein said brackets flank the internal walls of the container when the cover is in a closed position.

6. The hand dispenser for liquid products as in claim 3, wherein said guide grooves comprise, starting from an open end of the guide grooves, a first inclined length followed by a second vertical length.

7. The hand dispenser for liquid products as in claim 6, wherein when the cover is in a closed position the pins are located at the point of intersection between said first inclined length and said second vertical length of the guide grooves.

8. The hand dispenser for liquid products as in claim 7, wherein elastic ribs are further provided at the top of guide slots of the pins, to hold said pins, together with the dispensing button integral therewith, in a steady position when the cover is in an open position.

9. The hand dispenser for liquid products as in claim 1, wherein said dispensing button comprises contrast springs biasing the dispensing button away from the piston of the piston pump.

10. The hand dispenser for liquid products as in claim 1, wherein said cover is hinged at a lower side of the container.

11. The hand dispenser for liquid products as in claim 1, wherein said cover comprises a hole in correspondence of said nozzle to allow discharge of the liquid product when the cover is in a closed position.

12. The hand dispenser for liquid products as in claim 1, wherein said cover is steadily kept in a closed position by means of pairs of permanent magnets positioned on the container and on the inside of the cover.

13. The hand dispenser for liquid products as in claim 2, wherein said dispensing button comprises contrast springs biasing the dispensing button away from the piston of the piston pump.

14. The hand dispenser for liquid products as in claim 3, wherein said dispensing button comprises contrast springs biasing the dispensing button away from the piston of the piston pump.

15. The hand dispenser for liquid products as in claim 4, wherein said dispensing button comprises contrast springs biasing the dispensing button away from the piston of the piston pump.

16. The hand dispenser for liquid products as in claim 5, wherein said dispensing button comprises contrast springs biasing the dispensing button away from the piston of the piston pump.

17. The hand dispenser for liquid products as in claim 6, wherein said dispensing button comprises contrast springs biasing the dispensing button away from the piston of the piston pump.

18. The hand dispenser for liquid products as in claim 7, wherein said dispensing button comprises contrast springs biasing the dispensing button away from the piston of the piston pump.

19. The hand dispenser for liquid products as in claim 8, wherein said dispensing button comprises contrast springs biasing the dispensing button away from the piston of the piston pump.

20. The hand dispenser for liquid products as in claim 2, wherein said cover is hinged at a lower side of the container.

* * * * *